(No Model.)
I. JOYNER.
SAFETY HITCHING DEVICE.
No. 548,062. Patented Oct. 15, 1895.
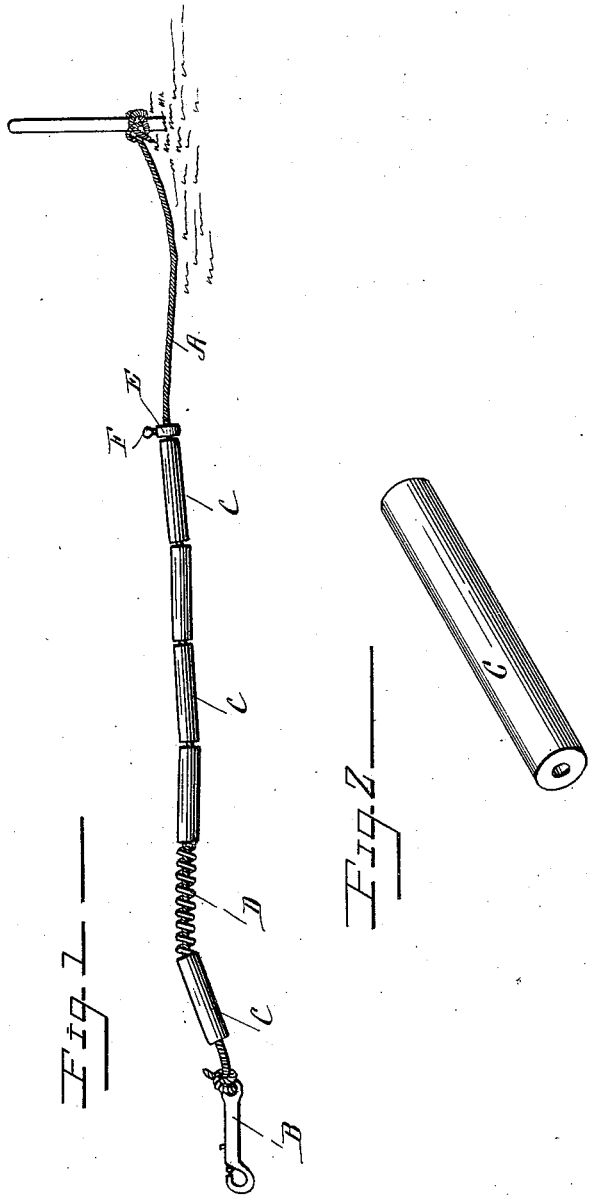
WITNESSES
Gn. N. Anderson
Phil O. Masi.
INVENTOR
Isaac Joyner
by E. W. Anderson
his Attorney

UNITED STATES PATENT OFFICE.

ISAAC JOYNER, OF ANDERSON, INDIANA.

SAFETY HITCHING DEVICE.

SPECIFICATION forming part of Letters Patent No. 548,062, dated October 15, 1895.

Application filed January 20, 1894. Serial No. 497,538. (No model.)

*To all whom it may concern:*

Be it known that I, ISAAC JOYNER, a citizen of the United States, and a resident of Anderson, in the county of Madison and State of Indiana, have invented certain new and useful Improvements in Safety Hitching Devices; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of the invention and is a perspective view, and Fig. 2 is a view of one of the sleeves or sections.

This invention has relation to a safety hitching device, and is designed to provide simple means for hitching or tethering horses and other animals in such a manner as to prevent them from tangling their legs or from being otherwise injured by the rope or tether; and the invention consists in the novel construction and combination of parts, all as hereinafter described, and pointed out in the appended claim.

Referring to the accompanying drawings, the letter A designates a rope, which is designed to be of any desired length and made fast at one end to a stake or other suitable object. At its free end the rope is provided with a snap-hook B for attachment to the halter or bridle. Strung on said rope at that portion next the hook B are a series of sleeves or tube-sections C, preferably of wood. Interposed between any two of said sections and bearing against the adjacent ends thereof is a spring D, which is coiled around the rope A. Said sleeves or tube-sections are held in proper relation to each other upon the rope by means of an adjustable collar E, having a set-screw F, which clamps it to the rope. By adjusting this collar the spring D may be compressed or extended, as may be desired, holding the sleeves or sections C in more or less close relation to each other, and thereby rendering the device more or less flexible.

It will be noted that the sleeves do not occupy the entire length of the rope, so that by making the adjustable collar loose on the rope and allowing the sleeves to separate from each other the rope may be permitted to have nearly its natural flexibility.

This device, while possessing sufficient flexibility to permit the free movement of the animal within the given radius, is rigid enough to prevent it from becoming wound around and entangled with the animal's legs.

I am aware that it is not new to provide a hitching or tether rope with sleeves, and I do not therefore attempt to claim the same, except in connection with means for their adjustment, whereby the flexibility of the device can be varied as may be desired.

I am aware that it is not broadly new to provide a hitching device wherein a series of blocks are strung upon a rope, a device of this kind being shown in the patent to Howe, No. 54,729, dated May 15, 1866, and I do not claim the invention, broadly. I am not aware, however, that such blocks have ever been used in connection with a spring and an adjusting-collar, whereby a greater or less rigidity may be readily given the device.

Having thus described my invention, what I believe to be new, and desire to secure by Letters Patent, is—

In a safety hitching device, the combination with a rope having a snap hook or like device at one end, of a series of perforated wooden blocks strung end to end on said rope and free to slide thereon, the united length of said blocks being considerably less than the length of the rope whereby said blocks may be moved toward and away from each other, a spring coiled around said ropes between two of the said blocks, and a set collar slidable on said rope, substantially as and for the purpose described.

In testimony whereof I affix my signature in presence of two witnesses.

ISAAC JOYNER.

Witnesses:
F. M. REED,
ZADOX B. HENDRIX.